United States Patent
Ohsawa et al.

(10) Patent No.: US 11,424,437 B2
(45) Date of Patent: Aug. 23, 2022

(54) NEGATIVE ELECTRODE, NON-AQUEOUS ELECTROLYTE SECONDARY BATTERY, AND METHOD OF PRODUCING NEGATIVE ELECTRODE

(71) Applicant: TOYOTA JIDOSHA KABUSHIKI KAISHA, Toyota (JP)

(72) Inventors: Ryosuke Ohsawa, Okazaki (JP); Akira Tsujiko, Miyoshi (JP); Kaoru Inoue, Hirakata (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 41 days.

(21) Appl. No.: 16/506,385

(22) Filed: Jul. 9, 2019

(65) Prior Publication Data

US 2020/0035992 A1    Jan. 30, 2020

(51) Int. Cl.
*H01M 4/131* (2010.01)
*H01M 50/538* (2021.01)
(Continued)

(52) U.S. Cl.
CPC ......... *H01M 4/131* (2013.01); *H01M 4/0459* (2013.01); *H01M 4/134* (2013.01); *H01M 4/1391* (2013.01); *H01M 4/364* (2013.01); *H01M 4/483* (2013.01); *H01M 4/485* (2013.01); *H01M 4/628* (2013.01); *H01M 10/052* (2013.01); *H01M 10/0525* (2013.01); *H01M 50/538* (2021.01); *H01M 2004/021* (2013.01); *H01M 2004/027* (2013.01)

(58) Field of Classification Search
CPC .... H01M 2/263; H01M 4/0459; H01M 4/131; H01M 4/134; H01M 4/1391; H01M 4/483; H01M 4/485; H01M 4/628; H01M 10/052; H01M 10/0525; H01M 2004/021; H01M 2004/027
See application file for complete search history.

(56) References Cited

U.S. PATENT DOCUMENTS

2013/0045419 A1*   2/2013   Chun .................... H01M 4/134
                                                        429/217
2015/0188127 A1*   7/2015   Niimi .................... H01M 4/625
                                                        429/231.95
(Continued)

FOREIGN PATENT DOCUMENTS

| JP | 2017-188319 A | 10/2017 |
| KR | 10-2013-0018498 A | 2/2013 |
| KR | 10-2016-0034799 A | 3/2016 |

*Primary Examiner* — Ula C Ruddock
*Assistant Examiner* — Mary Grace Byram
(74) *Attorney, Agent, or Firm* — Oliff PLC

(57) ABSTRACT

A negative electrode for a non-aqueous electrolyte secondary battery is provided. The negative electrode includes at least a negative electrode active material. The negative electrode active material includes a first type of silicon oxide particles and a second type of silicon oxide particles. The first type of silicon oxide particles has not been pre-doped with lithium. The second type of silicon oxide particles has been pre-doped with lithium. The first type of silicon oxide particles has a first average particle size. The second type of silicon oxide particles has a second average particle size. The ratio of the second average particle size to the first average particle size is not lower than 1.5 and not higher than 11.2.

9 Claims, 2 Drawing Sheets

(51) Int. Cl.
*H01M 4/134* (2010.01)
*H01M 4/04* (2006.01)
*H01M 10/0525* (2010.01)
*H01M 4/36* (2006.01)
*H01M 4/62* (2006.01)
*H01M 4/485* (2010.01)
*H01M 10/052* (2010.01)
*H01M 4/1391* (2010.01)
*H01M 4/48* (2010.01)
*H01M 4/02* (2006.01)

(56) References Cited

U.S. PATENT DOCUMENTS

2015/0372292 A1* 12/2015 Yokoi .................. H01M 4/366
 429/231.8
2016/0087267 A1* 3/2016 Yoshio ................ H01M 4/366
 429/231.95

* cited by examiner

NEGATIVE ELECTRODE, NON-AQUEOUS ELECTROLYTE SECONDARY BATTERY, AND METHOD OF PRODUCING NEGATIVE ELECTRODE

This nonprovisional application claims priority to Japanese Patent Application No. 2018-140007 filed on Jul. 26, 2018, with the Japan Patent Office, the entire contents of which are hereby incorporated by reference.

BACKGROUND

Field

The present disclosure relates to a negative electrode, a non-aqueous electrolyte secondary battery, and a method of producing a negative electrode.

Description of the Background Art

Japanese Patent Laying-Open No. 2017-188319 discloses preliminary doping of silicon oxide with lithium.

SUMMARY

As a negative electrode active material for use in a non-aqueous electrolyte secondary battery (which may be simply called "battery" hereinafter), silicon oxide ($SiO_x$) has been investigated. Silicon oxide is a promising material for its high capacity. However, silicon oxide tends to exhibit a great level of irreversible capacity loss in initial charge and discharge. The irreversible capacity loss may, in turn, interfere with an effective increase in initial capacity (initial discharged capacity).

Preliminary doping of silicon oxide with lithium (Li) has been proposed, which is called Li pre-doping. Li pre-doping may decrease irreversible capacity loss. However, Li pre-doping tends to degrade cycling performance. It may be because Li pre-doping causes alkaline component formation and the resulting alkaline component weakens binding force of a binder.

Hereinafter, silicon oxide not having been pre-doped with Li may be called "undoped $SiO_x$", and silicon oxide having been pre-doped with Li may be called "Li-doped $SiO_x$".

For obtaining a good balance between initial capacity and cycling performance, concurrent use of undoped $SiO_x$ and Li-doped $SiO_x$ may be considered. This is because adopting the two-component system of undoped $SiO_x$ and Li-doped $SiO_x$ may cause a decrease in irreversible capacity loss compared to adopting a single-component system of undoped $SiO_x$ and may also cause mitigation of alkaline component formation compared to adopting a single-component system of Li-doped $SiO_x$.

However, when the two-component system of undoped $SiO_x$ and Li-doped $SiO_x$ is adopted, electric current is concentrated to Li-doped $SiO_x$ and thereby cycling performance tends to be degraded. It may be because Li-doped $SiO_x$ has a high reactivity compared to undoped $SiO_x$.

An object of the present disclosure is to provide a non-aqueous electrolyte secondary battery having a high initial capacity as well as a good cycling performance.

In the following, the technical structure and the effects according to the present disclosure are described. It should be noted that the action mechanism according to the present disclosure includes presumption. Therefore, the scope of claims should not be limited by whether or not the action mechanism is correct.

[1] A negative electrode according to the present disclosure is a negative electrode for a non-aqueous electrolyte secondary battery. The negative electrode includes at least a negative electrode active material. The negative electrode active material includes a first type of silicon oxide particles and a second type of silicon oxide particles. The first type of silicon oxide particles has not been pre-doped with lithium. The second type of silicon oxide particles has been pre-doped with lithium. The first type of silicon oxide particles has a first average particle size. The second type of silicon oxide particles has a second average particle size. The ratio of the second average particle size to the first average particle size is not lower than 1.5 and not higher than 11.2.

In the present disclosure, silicon oxide particles (powder) are used. The first type of silicon oxide particles refers to undoped $SiO_x$ particles. The second type of silicon oxide particles refers to Li-doped $SiO_x$ particles.

FIG. 1 is a first conceptual view illustrating reactivity of a negative electrode active material.

The negative electrode active material according to the present disclosure includes undoped $SiO_x$ and Li-doped $SiO_x$. This two-component system of undoped $SiO_x$ and Li-doped $SiO_x$ may have a high initial capacity compared to a single-component system of undoped $SiO_x$. It may be because irreversible capacity loss is decreased compared to a single-component system of undoped $SiO_x$.

Li-doped $SiO_x$ has a high reactivity compared to undoped $SiO_x$. More specifically, Li-doped $SiO_x$ readily receives electrons ($e^-$) compared to undoped $SiO_x$. Therefore, electric current tends to be concentrated to Li-doped $SiO_x$ during charge. This electric current concentration may promote deterioration of Li-doped $SiO_x$. As a result, cycling performance of the negative electrode active material as a whole may be degraded.

FIG. 2 is a second conceptual view illustrating reactivity of a negative electrode active material.

According to the present disclosure, undoped $SiO_x$ has a smaller average particle size than that of Li-doped $SiO_x$. This may make the reactivity of undoped $SiO_x$ relatively high. It may be because the smaller the average particle size of particles is, the greater the specific surface area (namely, the reaction area) of the same particles is.

When reactivity of undoped $SiO_x$ is relatively high, the difference in reactivity between undoped $SiO_x$ and Li-doped $SiO_x$ may be decreased. This enables electric current to be evenly distributed to undoped $SiO_x$ and Li-doped $SiO_x$. As a result, a good cycling performance may be obtained.

The ratio of the second average particle size to the first average particle size (hereinafter, also called "particle size ratio") is not lower than 1.5 and not higher than 11.2. The "average particle size" herein refers to a particle size in volume-based particle size distribution at which the cumulative particle volume (accumulated from the side of small sizes) reaches 50% of the total particle volume. The volume-based particle size distribution is measured with a laser-diffraction particle size distribution analyzer. The first average particle size is the average particle size of the first type of silicon oxide particles. Hereinafter, the first average particle size is also called "$D50_{(1)}$". The second average particle size is the average particle size of the second type of silicon oxide particles. Hereinafter, the second average particle size is also called "$D50_{(2)}$".

In the configuration in which the particle size ratio $D50_{(2)}/D50_{(1)}$ is lower than 1.5, a sufficient level of cycling performance may not be obtained. It may be because electric current tends to be concentrated to Li-doped $SiO_x$. In the configuration in which the particle size ratio $D50_{(2)}/D50_{(1)}$ is higher than 11.2, a sufficient level of cycling performance may not be obtained. It may be because electric current tends to be concentrated to undoped $SiO_x$.

As discussed above, the present disclosure may provide a non-aqueous electrolyte secondary battery having a high initial capacity as well as a good cycling performance.

[2] In the negative electrode according to [1] above, the first average particle size may be not smaller than 0.9 μm and not greater than 4.3 μm and the second average particle size may be not smaller than 6.5 μm and not greater than 10.1 μm.

[3] In the negative electrode according to [1] or [2] above, the first type of silicon oxide particles may include no $Li_2Si_2O_5$ phase and the second type of silicon oxide particles may include a $Li_2Si_2O_5$ phase.

Discrimination between undoped $SiO_x$ and Li-doped $SiO_x$ may be carried out by checking the presence of a $Li_2Si_2O_5$ phase, for example.

Pre-doping $SiO_x$ with Li may cause formation of a $Li_2Si_2O_5$ phase, a $Li_4SiO_4$ phase, a $Li_2SiO_3$ phase, and the like within the $SiO_x$. In other words, Li-doped $SiO_x$ may include a $Li_2Si_2O_5$ phase. As for undoped $SiO_x$, on the other hand, although a $Li_4SiO_4$ phase and/or the like may be formed within undoped $SiO_x$ upon reaction with Li during initial charge, neither $Li_2Si_2O_5$ phase nor $Li_2SiO_3$ phase may be formed within undoped $SiO_x$ during charge-discharge reaction in the battery. Therefore, checking the presence of a $Li_2Si_2O_5$ phase may allow discrimination between undoped $SiO_x$ and Li-doped $SiO_x$. Detection of a $Li_2Si_2O_5$ phase may be carried out by X-ray diffraction (XRD), for example.

[4] A non-aqueous electrolyte secondary battery according to the present disclosure includes at least the negative electrode according to any one of [1] to [3] above. Therefore, the non-aqueous electrolyte secondary battery according to the present disclosure may have a high initial capacity as well as a good cycling performance.

[5] In a method of producing a negative electrode according to the present disclosure, a negative electrode for a non-aqueous electrolyte secondary battery is produced.

The method of producing a negative electrode according to the present disclosure includes at least (a) and (b) below:

(a) preparing a negative electrode active material; and
(b) producing a negative electrode including at least the negative electrode active material.

The negative electrode active material includes a first type of silicon oxide particles and a second type of silicon oxide particles. The first type of silicon oxide particles has not been pre-doped with lithium. The second type of silicon oxide particles has been pre-doped with lithium. The first type of silicon oxide particles has a first average particle size. The second type of silicon oxide particles has a second average particle size. The ratio of the second average particle size to the first average particle size is not lower than 1.5 and not higher than 11.2.

By the method of producing a negative electrode according to the present disclosure, the negative electrode according to [1] above may be produced.

[6] In the method of producing a negative electrode according to [5] above, the first average particle size may be not smaller than 0.9 μm and not greater than 4.3 μm and the second average particle size may be not smaller than 6.5 μm and not greater than 10.1 μm.

[7] In the method of producing a negative electrode according to [5] or [6] above, the first type of silicon oxide particles may include no $Li_2Si_2O_5$ phase and the second type of silicon oxide particles may include a $Li_2Si_2O_5$ phase.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

In the following, embodiments according to the present disclosure (herein called "present embodiment") are described. However, the description below does not limit the scope of claims.

<Non-Aqueous Electrolyte Secondary Battery>

Figure 1:
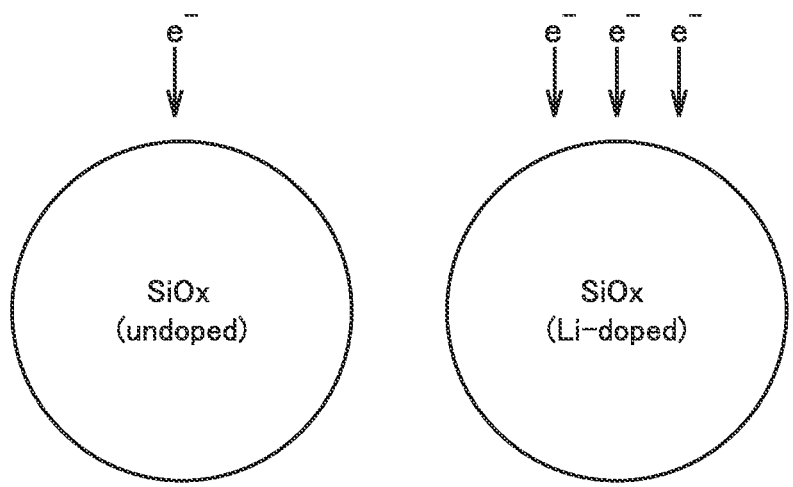
FIG. 1 is a first conceptual view illustrating reactivity of a negative electrode active material.
Figure 2:
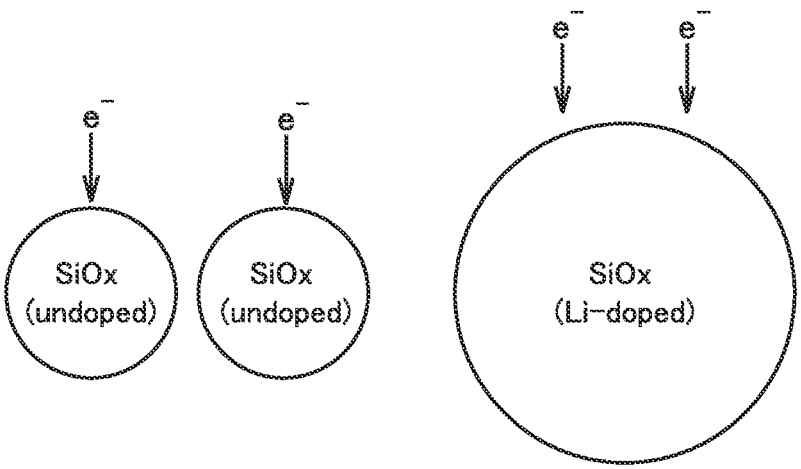
FIG. 2 is a second conceptual view illustrating reactivity of a negative electrode active material.
Figure 3:
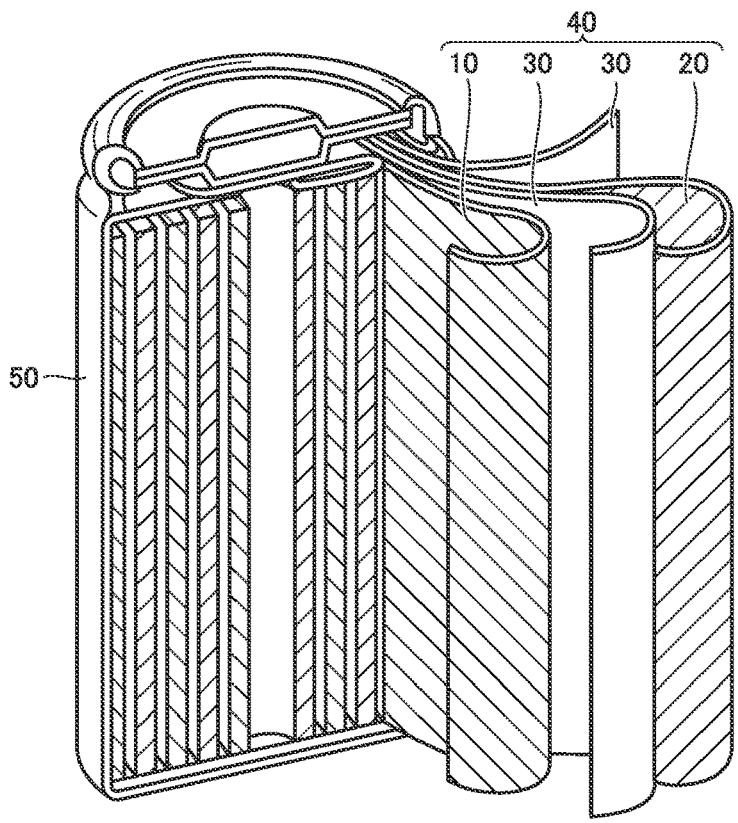
FIG. 3 is a schematic view illustrating the structure of a non-aqueous electrolyte secondary battery according to the present embodiment.

FIG. 3 is a schematic view illustrating the structure of a non-aqueous electrolyte secondary battery according to the present embodiment.

A battery 100 is a non-aqueous electrolyte secondary battery. Battery 100 includes a casing 50. Casing 50 is cylindrical. However, the shape of casing 50 is not limited to cylindrical. Casing 50 may be prismatic.

Casing 50 is hermetically sealed. Casing 50 may be made of resin, iron (Fe), stainless steel, aluminum (Al), and/or Al alloy, for example. Casing 50 may be, for example, a pouch made of an aluminum-laminated film. In other words, battery 100 may be a laminate-type battery. Casing 50 may be equipped with a current interrupt device (CID), a gas-discharge valve, and a liquid inlet, for example.

Casing 50 accommodates an electrode array 40 and an electrolyte solution (not shown). Electrode array 40 includes a positive electrode 10, a negative electrode 20, and a separator 30. In other words, battery 100 includes at least negative electrode 20. Electrode array 40 is a wound-type one. Electrode array 40 is formed by stacking positive electrode 10, separator 30, negative electrode 20, and separator 30 in this order and then winding them in a spiral fashion.

Electrode array 40 may be a stack-type one. More specifically, electrode array 40 may be formed by alternately stacking one positive electrode 10 and one negative electrode 20 and then repeating this alternate stacking process more than once. In each space between positive electrode 10 and negative electrode 20, separator 30 is interposed.

«Negative Electrode»

Negative electrode 20 is in sheet form. Negative electrode 20 includes a negative electrode current collector and a negative electrode composite material. The negative electrode current collector is not particularly limited. The negative electrode current collector may be a Cu foil, for example. The negative electrode current collector may have a thickness not smaller than 5 μm and not greater than 50 μm, for example.

The negative electrode composite material is disposed on a surface of the negative electrode current collector. The negative electrode composite material may be disposed on one side of the negative electrode current collector. The negative electrode composite material may be disposed on both sides of the negative electrode current collector. The negative electrode composite material may form a layer on a surface of the negative electrode current collector. The layer made of the negative electrode composite material may have a thickness not smaller than 10 µm and not greater than 200 µm, for example.

(Negative Electrode Active Material)

The negative electrode composite material includes at least a negative electrode active material. In other words, negative electrode 20 includes at least a negative electrode active material. The negative electrode composite material may further include a conductive material, a binder, and the like in addition to the negative electrode active material. The negative electrode active material includes a first type of silicon oxide particles and a second type of silicon oxide particles.

Each type of silicon oxide according to the present embodiment is a compound containing silicon (Si) and oxygen (O) as essential components. Each type of silicon oxide may be represented by the following formula (I), for example:

$$SiO_x \qquad (I)$$

where x satisfies 0<x<2.

In the above formula (I), x may satisfy $0.5 \leq x \leq 1.5$, for example. x may satisfy $0.8 \leq x \leq 1.2$, for example. Each type of silicon oxide may be a compound consisting essentially of Si and O. Each type of silicon oxide may contain a trace amount of an element other than Si or O. The "trace amount" refers to an amount of 1 mol % or lower, for example. The element contained in a trace amount may be, for example, an element that is inevitably entrapped during synthesis of the silicon oxide.

The first type of silicon oxide particles has not been pre-doped with Li. In other words, the first type of silicon oxide particles is undoped $SiO_x$ particles. Undoped $SiO_x$ may consist essentially of a $SiO_x$ phase. Part of undoped $SiO_x$ may be a Si phase, for example.

The second type of silicon oxide particles has been pre-doped with Li. In other words, the second type of silicon oxide particles is Li-doped $SiO_x$ particles. Li-doped $SiO_x$ may further include a $Li_2Si_2O_5$ phase and the like (described below) in addition to a $SiO_x$ phase.

When a two-component system of undoped $SiO_x$ and Li-doped $SiO_x$ is adopted, electric current is concentrated to Li-doped $SiO_x$ to potentially promote deterioration. The cause of the electric current concentration may be the reactivity of Li-doped $SiO_x$ that is higher than that of undoped $SiO_x$. In the present embodiment, reactivity of undoped $SiO_x$ and reactivity of Li-doped $SiO_x$ are in a good balance because adjustment of a particle size ratio $D50_{(2)}/D50_{(1)}$ is carried out.

(Particle Size Ratio)

The first type of silicon oxide particles has a first average particle size $D50_{(1)}$. The second type of silicon oxide particles has a second average particle size $D50_{(2)}$. A particle size ratio $D50_{(2)}/D50_{(1)}$ is not lower than 1.5 and not higher than 11.2. With the particle size ratio $D50_{(2)}/D50_{(1)}$ being not lower than 1.5 and not higher than 11.2, the difference in reactivity between the first type of silicon oxide particles (undoped $SiO_x$) and the second type of silicon oxide particles (Li-doped $SiO_x$) may decrease. As a result, a good cycling performance may be obtained. The particle size ratio $D50_{(2)}/D50_{(1)}$ is significant to one decimal place. If necessary, the particle size ratio $D50_{(2)}/D50_{(1)}$ is rounded off to the first decimal place.

$D50_{(1)}$ may be not smaller than 0.9 µm and not greater than 4.3 µm, for example. $D50_{(2)}$ may be not smaller than 6.5 µm and not greater than 10.1 µm, for example.

(Mass Ratio)

The first type of silicon oxide particles and the second type of silicon oxide particles may satisfy the following relation, for example:

(First type of silicon oxide particles):(second type of silicon oxide particles)=1:9 to 9:1 (mass ratio).

Within this range, a good balance between initial capacity and cycling performance may be obtained.

($Li_2Si_2O_5$ Phase)

As a result of pre-doping, Li-doped $SiO_x$ thus obtained may include various lithium silicate phases. Li-doped $SiO_x$ may include a $Li_2Si_2O_5$ phase, for example. On the other hand, undoped $SiO_x$ may include no $Li_2Si_2O_5$ phase. In other words, in the present embodiment, the first type of silicon oxide particles may include no $Li_2Si_2O_5$ phase and the second type of silicon oxide particles may include a $Li_2Si_2O_5$ phase. The second type of silicon oxide particles may further include a $SiO_x$ phase, a Si phase, a $Li_4SiO_4$ phase, a $Li_2SiO_3$ phase, and the like in addition to a $Li_2Si_2O_5$ phase. For instance, in the present embodiment, the first type of silicon oxide particles may include neither $Li_2Si_2O_5$ phase nor $Li_2SiO_3$ phase and the second type of silicon oxide particles may include a $Li_2Si_2O_5$ phase and a $Li_2SiO_3$ phase.

(XRD)

The presence of a $Li_2Si_2O_5$ phase may be checked on a powder XRD chart, for example. A diffraction chart of silicon oxide particles that include a $Li_2Si_2O_5$ phase may have the following characteristics: a ratio P1/P2, which is the ratio of the height P1 of the peak appearing at a diffraction angle 2θ from 24.5 to 25.0° to the height P2 of the peak appearing at a diffraction angle 2θ from 45 to 50°, is 0.1 or higher.

The peak appearing at a diffraction angle 2θ from 45 to 50° is likely to be attributed to a Si phase. The peak appearing at a diffraction angle 2θ from 24.5 to 25.0° is likely to be attributed to a $Li_2Si_2O_5$ phase. If the peak height ratio P1/P2 is 0.1 or higher, the silicon oxide particles are likely to include a $Li_2Si_2O_5$ phase. If the peak height ratio P1/P2 is lower than 0.1, the silicon oxide particles are likely to include substantially no $Li_2Si_2O_5$ phase.

The measurement conditions for the powder XRD may be as follows, for example:

Measurement temperature: room temperature (20° C.±5° C.)

Monochromator: single crystal graphite

Counter: scintillation counter

X-ray source: Cu-Kα ray (wavelength, 1.54051 Å)

Tube voltage: 50 kV

Tube current: 300 mA

Measurement range: 2θ=10° to 90°

Scanning speed: 10°/min

Step width: 0.02°

(Additional Component)

As long as including the first type of silicon oxide particles and the second type of silicon oxide particles, the negative electrode active material may further include an additional component. Examples of the additional component may include graphite, soft carbon, hard carbon, silicon, silicon-based alloy, tin, tin oxide, tin-based alloy, and lithium titanium oxide. The additional component may be graphite, for example. Graphite has a high conductivity and therefore may be suitable for use with silicon oxide. The ratio of the additional component in the total negative electrode active material may be not lower than 1 mass % and not higher than 99 mass %, for example. The ratio of the additional component in the total negative electrode active material may be not lower than 80 mass % and not higher than 95 mass %, for example.

(Conductive Material)

The negative electrode composite material may include a conductive material. The conductive material forms a conductive path within the negative electrode composite material. The conductive material is not particularly limited. The conductive material may be carbon black, graphene, and/or carbon nanotubes, for example. The carbon black may be acetylene black (AB) and/or Ketjenblack (registered trademark), for example. The negative electrode composite material may include only one type of the conductive material. The negative electrode composite material may include two or more types of the conductive material. The content of the conductive material may be, for example, not lower than 0.1 part by mass and not higher than 10 parts by mass relative to 100 parts by mass of the negative electrode active material.

(Binder)

The negative electrode composite material may include a binder. The binder binds the components of the negative electrode composite material to each other. The binder is not particularly limited. The binder may be carboxymethylcellulose (CMC), styrene-butadiene rubber (SBR), polyacrylic acid (PAA), polyacrylic acid ester, and/or polyimide, for example. The negative electrode composite material may include only one type of the binder. The negative electrode composite material may include two or more types of the binder. The content of the binder may be, for example, not lower than 0.1 part by mass and not higher than 10 parts by mass relative to 100 parts by mass of the negative electrode active material.

«Positive Electrode»

Positive electrode 10 is in sheet form. Positive electrode 10 includes a positive electrode current collector and a positive electrode composite material. The positive electrode current collector may be an Al foil, for example. The positive electrode current collector may have a thickness not smaller than 5 μm and not greater than 50 μm, for example.

The positive electrode composite material is disposed on a surface of the positive electrode current collector. The positive electrode composite material may be disposed on one side of the positive electrode current collector. The positive electrode composite material may be disposed on both sides of the positive electrode current collector. The positive electrode composite material may form a layer on a surface of the positive electrode current collector. The layer made of the positive electrode composite material may have a thickness not smaller than 10 μm and not greater than 200 μm, for example. The positive electrode composite material includes at least a positive electrode active material. The positive electrode composite material may further include a conductive material, a binder, and the like in addition to the positive electrode active material.

The positive electrode active material may be in powder form, for example. The positive electrode active material may have a D50 not lower than 1 μm and not higher than 30 μm, for example. The positive electrode active material is not particularly limited. The positive electrode active material may be lithium cobalt oxide ($LiCoO_2$), lithium nickel oxide ($LiNiO_2$), lithium manganese oxide (such as $LiMnO_2$ and $LiMn_2O_4$), lithium nickel cobalt manganese oxide (such as $LiNi_{1/3}Co_{1/3}Mn_{1/3}O_2$ and $LiNi_{0.5}Co_{0.2}Mn_{0.3}O_2$), lithium nickel cobalt aluminate (such as $LiNi_{0.82}Co_{0.15}Al_{0.03}O_2$), and/or lithium iron phosphate ($LiFePO_4$), for example. The positive electrode composite material may include only one type of the positive electrode active material. The positive electrode composite material may include two or more types of the positive electrode active material.

The conductive material is not particularly limited. For instance, the conductive material may be a material described above as an example of the conductive material that may be included in the negative electrode composite material. The content of the conductive material may be, for example, not lower than 0.1 part by mass and not higher than 10 parts by mass relative to 100 parts by mass of the positive electrode active material. The binder is not particularly limited. The binder may be polyvinylidene difluoride (PVdF), for example. The content of the binder may be, for example, not lower than 0.1 part by mass and not higher than 10 parts by mass relative to 100 parts by mass of the positive electrode active material.

«Separator»

Separator 30 is electrically insulating. Separator 30 is interposed between positive electrode 10 and negative electrode 20. Separator 30 separates positive electrode 10 from negative electrode 20. Separator 30 is a porous film. Separator 30 allows the electrolyte solution to pass therethrough. Separator 30 may have a thickness not smaller than 10 μm and not greater than 30 μm, for example. Separator 30 may be a porous polyolefin film, for example.

Separator 30 may have a monolayer structure. Separator 30 may consist of a porous polyethylene (PE) film, for example. Separator 30 may have a multilayer structure. Separator 30 may be formed by stacking a porous polypropylene (PP) film, a porous PE film, and a porous PP film in this order, for instance. On a surface of separator 30, a heat-resistant film may be formed. The heat-resistant film is also porous. The heat-resistant film includes a heat-resistant material. The heat-resistant material may be boehmite, silica, and/or titania, for example.

«Electrolyte Solution»

The electrolyte solution contains at least a Li salt and a solvent. The Li salt is dissolved in the solvent. The concentration of the Li salt may be not lower than 0.5 mol/L and not higher than 2 mol/L (not lower than 0.5 M and not higher than 2 M), for example. The Li salt may be $LiPF_6$, $LiBF_4$, $LiN(FSO_2)_2$, and/or $LiN(CF_3SO_2)_2$, for example. The electrolyte solution may contain only one type of the Li salt. The electrolyte solution may contain two or more types of the Li salt.

The solvent is aprotic. The solvent may be a mixture of a cyclic carbonate and a chain carbonate, for example. The mixing ratio may be, for example:

(Cyclic carbonate):(chain carbonate)=1:9 to 5:5 (volume ratio).

The cyclic carbonate may be ethylene carbonate (EC), propylene carbonate (PC), butylene carbonate (BC), and/or fluoroethylene carbonate (FEC), for example. The solvent may include only one type of the cyclic carbonate. The solvent may include two or more types of the cyclic carbonate.

The chain carbonate may be dimethyl carbonate (DMC), ethyl methyl carbonate (EMC), and/or diethyl carbonate (DEC), for example. The solvent may include only one type of the chain carbonate. The solvent may include two or more types of the chain carbonate.

The solvent may include a lactone, a cyclic ether, a chain ether, and a carboxylate ester, for example. The lactone may be γ-butyrolactone (GBL) and/or δ-valerolactone, for example. The cyclic ether may be tetrahydrofuran (THF), 1,3-dioxolane, and/or 1,4-dioxane, for example. The chain ether may be 1,2-dimethoxyethane (DME), for example. The carboxylate ester may be methyl formate (MF), methyl acetate (MA), and/or methyl propionate (MP), for example.

The electrolyte solution may further contain various additives in addition to the Li salt and the solvent. The electrolyte solution may contain the additives in an amount not lower than 0.005 mol/L and not higher than 0.5 mol/L, for example. Examples of the additives may include a gas generation agent (also called "anti-overcharging additive"), a solid electrolyte interface (SEI) film-forming agent, and a flame retardant.

The gas generation agent may be cyclohexylbenzene (CHB) and/or biphenyl (BP), for example. The SEI-film-forming agent may be vinylene carbonate (VC), vinylethylene carbonate (VEC), $LiB(C_2O_4)_2$, $LiPO_2F_2$, propane sultone (PS), and/or ethylene sulfite (ES), for example. The flame retardant may be a phosphoric acid ester and/or a phosphazene, for example.

<Method of Producing Negative Electrode>

Figure 4:
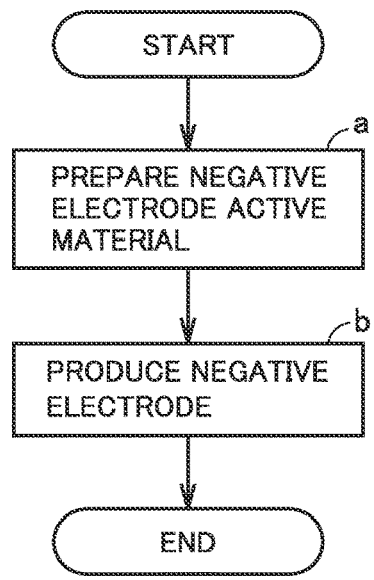
FIG. 4 is a flowchart schematically illustrating a method of producing a negative electrode according to the present embodiment.

FIG. 4 is a flowchart schematically illustrating a method of producing a negative electrode according to the present embodiment.

The method of producing a negative electrode according to the present embodiment includes at least "(a) preparing a negative electrode active material" and "(b) producing a negative electrode".

《(a) Preparing Negative Electrode Active Material》

The method of producing a negative electrode according to the present embodiment includes preparing a negative electrode active material.

The negative electrode active material is described above in detail. More specifically, the negative electrode active material includes a first type of silicon oxide particles and a second type of silicon oxide particles. The first type of silicon oxide particles has not been pre-doped with Li. The second type of silicon oxide particles has been pre-doped with Li.

The first type of silicon oxide particles has $D50_{(1)}$. The second type of silicon oxide particles has $D50_{(2)}$. In the present embodiment, the first type of silicon oxide particles and the second type of silicon oxide particles are prepared so that a particle size ratio $D50_{(2)}/D50_{(1)}$ is not lower than 1.5 and not higher than 11.2.

$D50_{(1)}$ and $D50_{(2)}$ are measured with a laser-diffraction particle size distribution analyzer. Measurement of each of $D50_{(1)}$ and $D50_{(2)}$ is carried out at least three times. The arithmetic mean of these at least three measurements is used.

For example, the first type of silicon oxide particles may be prepared by purchasing a commercially available undoped $SiO_x$. The first type of silicon oxide particles may be prepared by synthesizing undoped $SiO_x$. In order to adjust $D50_{(1)}$ to a value not smaller than 0.9 μm and not greater than 4.3 μm, for example, at least one of pulverization and classification may be carried out. The pulverization may be carried out with a typical mill. The classification may be carried out with a typical classifier.

For example, the second type of silicon oxide particles may be prepared by purchasing a commercially available Li-doped $SiO_x$. In order to adjust $D50_{(2)}$ to a value not smaller than 6.5 μm and not greater than 10.1 μm, for example, at least one of pulverization and classification may be carried out.

For example, the second type of silicon oxide particles may be prepared by pre-doping undoped $SiO_x$ with Li. The method of pre-doping is not particularly limited. For example, pre-doping may be carried out by the method described below. For example, undoped $SiO_x$ powder and Li material powder are prepared. The Li material may be lithium hydride (LiH), for example. The undoped $SiO_x$ and the Li material are mixed together to prepare a mixture. The resulting mixture is heated at about 1000° C. for about 60 minutes in, for example, an argon (Ar) atmosphere. By this, undoped $SiO_x$ may be pre-doped with Li; in other words, Li-doped $SiO_x$ may be produced. Li-doped $SiO_x$ thus produced may be rinsed with an inorganic acid (such as hydrochloric acid), for example. The rinsing may reduce the amount of impurities, for example.

《(b) Producing Negative Electrode》

The method of producing a negative electrode according to the present embodiment includes producing a negative electrode that includes at least the negative electrode active material.

For example, the negative electrode active material, a conductive material, a binder, and a solvent are mixed, and thereby a negative electrode composite material slurry is prepared. The mixing may be carried out with a typical mixer, a typical dispersing apparatus, and/or the like, such as a homogenizing disperser and/or a planetary mixer. The negative electrode active material, the conductive material, and the binder are described above in detail. As the solvent, a solvent suitable for the type of the binder and/or the like is selected. When the binder is a combination of CMC and SBR, for example, the solvent may be water.

A negative electrode current collector is prepared. The negative electrode current collector is described above in detail. To a surface of the negative electrode current collector, the negative electrode composite material slurry is applied, followed by drying. Thereby, the negative electrode composite material may be disposed on a surface of the negative electrode current collector. The applying may be carried out with a typical applicator (such as a die coater or a gravure coater). The drying may be carried out with a typical dryer (such as a hot-air dryer or an infrared dryer). The negative electrode composite material may be disposed on one side of the negative electrode current collector. The negative electrode composite material may be disposed on both sides of the negative electrode current collector.

In this manner, negative electrode 20 may be produced. Negative electrode 20 includes at least a negative electrode active material. Negative electrode 20 may be compressed into a predetermined thickness so as to meet the specifications of battery 100. Negative electrode 20 may be cut into predetermined planar dimensions so as to meet the specifications of battery 100.

EXAMPLES

Next, examples according to the present disclosure are described. However, the description below does not limit the scope of claims.

Example 1

《(a) Preparing Negative Electrode Active Material》

The materials described below were prepared.

First type of silicon oxide particles: undoped SiO, $D50_{(1)}$=4.3 μm

Second type of silicon oxide particles: Li-doped SiO, $D50_{(2)}$=6.5 μm

"SiO" refers to a compound represented by the above formula (I) where x=1.

«(b) Producing Negative Electrode»

The materials described below were prepared.

Conductive material: AB
Binder: CMC and SBR
Solvent: ion-exchanged water
Negative electrode current collector: Cu foil The negative electrode active material, the conductive material, the binder, and the solvent were mixed, and thereby a negative electrode composite material slurry was prepared. The solid matter mixing ratio was as follows:

(First type of silicon oxide particles):(second type of silicon oxide particles):AB:CMC:SBR=10:90:5:1:5 (mass ratio).

The negative electrode composite material slurry was applied to a surface of the negative electrode current collector with a film applicator manufactured by Allgood. The negative electrode composite material slurry was dried with a hot-air dryer. The drying was carried out at a temperature of 80° C. The drying duration was five minutes. Thus, a negative electrode composite material was disposed on a surface of the negative electrode current collector. In this way, negative electrode 20 was produced.

<Producing Battery>

Positive electrode 10 was prepared. As a positive electrode active material, lithium nickel cobalt manganese oxide was used. Separator 30 was prepared. Separator 30 was a porous PE film. Positive electrode 10, separator 30, negative electrode 20, and separator 30 were stacked in this order and then wound in a spiral fashion, and thus electrode array 40 was formed.

Casing 50 was prepared. Casing 50 was cylindrical. In casing 50, electrode array 40 was placed. Into casing 50, an electrolyte solution was injected. The electrolyte solution consisted of components described below.

Li salt: $LiPF_6$ (concentration, 1 mol/L)
Solvent: [EC:DMC:EMC=3:4:3 (volume ratio)]

Casing 50 was hermetically sealed. Thus, battery 100 (a cylindrical non-aqueous electrolyte secondary battery) was produced. Battery 100 was designed to operate within a voltage range of 3.0 to 4.1 V.

Example 2

Negative electrode 20 was produced in the same manner as in Example 1 except that the mass ratio between the first type of silicon oxide particles and the second type of silicon oxide particles was changed as specified in Table 1 below. Then, battery 100 including negative electrode 20 was produced in the same manner as in Example 1.

Example 3

Negative electrode 20 was produced in the same manner as in Example 1 except that $D50_{(1)}$ and $D50_{(2)}$ were changed as specified in Table 1 below. Then, battery 100 including negative electrode 20 was produced in the same manner as in Example 1.

Example 4

Negative electrode 20 was produced in the same manner as in Example 3 except that the mass ratio between the first type of silicon oxide particles and the second type of silicon oxide particles was changed as specified in Table 1 below. Then, battery 100 including negative electrode 20 was produced in the same manner as in Example 1.

Comparative Example 1

Negative electrode 20 was produced in the same manner as in Example 1 except that the first type of silicon oxide particles having $D50_{(1)}$ specified in Table 1 below was used alone as the negative electrode active material. Then, battery 100 including negative electrode 20 was produced in the same manner as in Example 1.

Comparative Example 2

Negative electrode 20 was produced in the same manner as in Example 1 except that the second type of silicon oxide particles having $D50_{(2)}$ specified in Table 1 below was used alone as the negative electrode active material. Then, battery 100 including negative electrode 20 was produced in the same manner as in Example 1.

Comparative Examples 3 to 6

Negative electrode 20 was produced in the same manner as in Example 1 except that the mass ratio between the first type of silicon oxide particles and the second type of silicon oxide particles as well as $D50_{(1)}$ and $D50_{(2)}$ were changed as specified in Table 1 below. Then, battery 100 including negative electrode 20 was produced in the same manner as in Example 1.

<Evaluation>

«Battery Capacity»

Battery 100 was charged to 4.1 V. After charging, battery 100 was discharged to 3.0 V. After discharging, the voltage of battery 100 was adjusted to 3.7 V. After voltage adjustment, battery 100 was left to stand for nine hours in a thermostatic chamber set at 60° C. After this, charge and discharge were carried out at a rate of 0.1 C. The discharged capacity measured at this time is the initial capacity. The initial capacity is shown in Table 1 below. Each value in column "Initial capacity" in Table 1 below is expressed as a percentage; the value is obtained by dividing the initial capacity of each example by the initial capacity of Comparative Example 1 and then converting the resultant into percentage. At a rate of 0.1 C, discharging battery 100 from its rated capacity completes in ten hours.

«Charge Properties»

After the initial capacity measurement, the voltage of battery 100 was adjusted to 3.7 V. After voltage adjustment, battery 100 was charged at a rate of 1 C for ten seconds in a thermostatic chamber set at 0° C. The relation between the rate and the voltage increment during charge was used to calculate direct-current resistance. Results are shown in Table 1 below. Each value in column "Direct-current resistance (0° C.)" in Table 1 below is expressed as a percentage; the value is obtained by dividing the direct-current resistance of each example by the direct-current resistance of Comparative Example 1 and then converting the resultant into percentage. The lower the direct-current resistance is, the better the charge properties may be. At a rate of 1 C, discharging battery 100 from its rated capacity completes in one hour.

«Cycling Performance»

In an environment at room temperature, 100 cycles of charge and discharge were carried out at a constant current of 2 C and a voltage within the range of 3.0 to 4.1 V. Then, capacity retention was measured. The capacity retention thus measured is shown in Table 1 below. Each value in column "Capacity retention" in Table 1 below is expressed as a percentage; the value is obtained by dividing the discharged capacity measured after the 100th cycle by the discharged capacity measured after the first cycle and then converting the resultant into percentage. The higher the capacity retention is, the better the cycling performance may be. At a rate of 2 C, discharging battery 100 from its rated capacity completes in 0.5 hour.

The embodiments and examples disclosed herein are illustrative and non-restrictive in any respect. The technical scope indicated by the claims is intended to include any modifications within the scope and meaning equivalent to the terms of the claims.

TABLE 1

| | Negative electrode | | | | | | | | | | |
|---|---|---|---|---|---|---|---|---|---|---|---|
| | Composition | | | | | | | | Evaluation | | |
| | Negative electrode active material | | | | | | | | | | |
| | First type of silicon oxide particles, undoped | Second type of silicon oxide particles, Li-doped | Conductive material | Binder | | | | | Battery capacity | Charge properties Direct-current resistance | Cycling performance |
| | $SiO_x$ | $SiO_x$ | AB | CMC | SBR | Particle size | | | Initial | (0° C.) | Capacity retention |
| | parts by mass | parts by mass | parts by mass | parts by mass | parts by mass | $D50_{(1)}$ μm | $D50_{(2)}$ μm | $D50_{(2)}/D50_{(1)}$ | capacity % | % | % |
| Comp. Ex. 1 | 100 | 0 | 5 | 1 | 5 | 4.8 | — | — | 100 | 100 | 72 |
| Comp. Ex. 2 | 0 | 100 | 5 | 1 | 5 | — | 5.7 | — | 110 | 110 | 50 |
| Comp. Ex. 3 | 10 | 90 | 5 | 1 | 5 | 4.8 | 5.7 | 1.2 | 102 | 107 | 60 |
| Comp. Ex. 4 | 90 | 10 | 5 | 1 | 5 | 4.8 | 5.7 | 1.2 | 107 | 105 | 67 |
| Ex. 1 | 10 | 90 | 5 | 1 | 5 | 4.3 | 6.5 | 1.5 | 104 | 95 | 74 |
| Ex. 2 | 90 | 10 | 5 | 1 | 5 | 4.3 | 6.5 | 1.5 | 110 | 94 | 76 |
| Ex. 3 | 10 | 90 | 5 | 1 | 5 | 0.9 | 10.1 | 11.2 | 104 | 95 | 75 |
| Ex. 4 | 90 | 10 | 5 | 1 | 5 | 0.9 | 10.1 | 11.2 | 109 | 96 | 75 |
| Comp. Ex. 5 | 10 | 90 | 5 | 1 | 5 | 0.8 | 12.3 | 15.4 | 103 | 113 | 52 |
| Comp. Ex. 6 | 90 | 10 | 5 | 1 | 5 | 0.8 | 12.3 | 15.4 | 106 | 112 | 57 |

<Results>

In Comparative Example 1, initial capacity was low. It may be because a second type of silicon oxide particles (Li-doped $SiO_x$) was not used.

In Comparative Example 2, a sufficient level of cycling performance was not obtained. It may be because a first type of silicon oxide particles (undoped $SiO_x$) was not used.

In Comparative Examples 3 and 4, a sufficient level of cycling performance was not obtained. In Comparative Examples 3 and 4, the particle size ratio $D50_{(2)}/D50_{(1)}$ was lower than 1.5. Electric current may have been concentrated to Li-doped $SiO_x$ to promote deterioration.

In Comparative Examples 5 and 6, a sufficient level of cycling performance was not obtained. In Comparative Examples 5 and 6, the particle size ratio $D50_{(2)}/D50_{(1)}$ was higher than 11.2. Electric current may have been concentrated to undoped $SiO_x$ to promote deterioration.

In Examples 1 to 4, initial capacity was high. It may be because undoped $SiO_x$ and Li-doped $SiO_x$ were concurrently used.

In Examples 1 to 4, a good cycling performance was obtained. In Examples 1 to 4, the particle size ratio $D50_{(2)}/D50_{(1)}$ was not lower than 1.5 and not higher than 11.2. The particle size ratio $D50_{(2)}/D50_{(1)}$ being not lower than 1.5 and not higher than 11.2 may have, in turn, decreased the difference in reactivity between undoped $SiO_x$ and Li-doped $SiO_x$. Electric current may have been evenly distributed to undoped $SiO_x$ and Li-doped $SiO_x$ to mitigate progress of deterioration.

In Examples 1 to 4, good charge properties were also obtained. Electric current may have been evenly distributed to undoped $SiO_x$ and Li-doped $SiO_x$ during charge to improve the charge properties of the negative electrode active material as a whole.

What is claimed is:

1. A negative electrode for a non-aqueous electrolyte secondary battery, comprising at least:
   a negative electrode active material,
   the negative electrode active material including a first type of silicon oxide particles and a second type of silicon oxide particles,
   the first type of silicon oxide particles not having been pre-doped with lithium,
   the second type of silicon oxide particles having been pre-doped with lithium,
   the first type of silicon oxide particles having a first average particle size,
   the second type of silicon oxide particles having a second average particle size,
   the ratio of the second average particle size to the first average particle size being not lower than 1.5 and not higher than 11.2, and
   neither the first type nor the second type of silicon oxide particles having been coated by carbon.

2. The negative electrode according to claim 1, wherein the first average particle size is not smaller than 0.9 μm and not greater than 4.3 μm, and
   the second average particle size is not smaller than 6.5 μm and not greater than 10.1 μm.

3. The negative electrode according to claim 1, wherein the first type of silicon oxide particles includes no $Li_2Si_2O_5$ phase, and
   the second type of silicon oxide particles includes a $Li_2Si_2O_5$ phase.

4. A non-aqueous electrolyte secondary battery comprising at least the negative electrode according to claim 1.

5. A method of producing the negative electrode for a non-aqueous electrolyte secondary battery of claim 1, the method comprising at least:
  preparing the negative electrode active material; and
  producing the negative electrode including at least the negative electrode active material.

6. The method of producing a negative electrode according to claim 5, wherein
  the first average particle size is not smaller than 0.9 μm and not greater than 4.3 μm, and
  the second average particle size is not smaller than 6.5 μm and not greater than 10.1 μm.

7. The method of producing a negative electrode according to claim 5, wherein
  the first type of silicon oxide particles includes no $Li_2Si_2O_5$ phase, and
  the second type of silicon oxide particles includes a $Li_2Si_2O_5$ phase.

8. The negative electrode according to claim 1, wherein the first type of silicon oxide particles: the second type of silicon oxide particles=1:9 to 9:1 in terms of mass ratio.

9. The negative electrode according to claim 1, wherein the first type of silicon oxide particles includes no $Li_2SiO_3$ phase, and the second type of silicon oxide particles includes a $Li_2SiO_3$ phase.

* * * * *

UNITED STATES PATENT AND TRADEMARK OFFICE
CERTIFICATE OF CORRECTION

| | | |
|---|---|---|
| PATENT NO. | : 11,424,437 B2 | |
| APPLICATION NO. | : 16/506385 | |
| DATED | : August 23, 2022 | |
| INVENTOR(S) | : Ryosuke Ohsawa et al. | |

It is certified that error appears in the above-identified patent and that said Letters Patent is hereby corrected as shown below:

On the Title Page

At Column 1, please insert Item (30) as follows:
--(30) Foreign Application Priority Data
Jul. 26, 2018 (JP) .........2018-140007--.

Signed and Sealed this
Fifteenth Day of November, 2022

Katherine Kelly Vidal
*Director of the United States Patent and Trademark Office*